United States Patent
Bertz et al.

(10) Patent No.: US 11,497,069 B1
(45) Date of Patent: Nov. 8, 2022

(54) WIRELESS COMMUNICATION NETWORK TO SERVE A PROTOCOL DATA UNIT (PDU) SESSION TYPE OVER A RADIO ACCESS NETWORK (RAN)

(71) Applicant: T-Mobile Innovations LLC, Overland Park, KS (US)

(72) Inventors: Lyle T. Bertz, Lee's Summit, MO (US); Robert Keith Butler, Overland Park, KS (US); Laurent Alexandre Laporte, Spring Hill, KS (US); Tracy Lee Nelson, Overland Park, KS (US)

(73) Assignee: Sprint Communications Company LP, Overland Park, KS (US)

( * ) Notice: Subject to any disclaimer, the term of this patent is extended or adjusted under 35 U.S.C. 154(b) by 52 days.

(21) Appl. No.: 17/203,319

(22) Filed: Mar. 16, 2021

(51) Int. Cl.
*H04W 76/12* (2018.01)
*H04W 80/02* (2009.01)

(52) U.S. Cl.
CPC .................... *H04W 76/12* (2018.02)

(58) Field of Classification Search
CPC ....... H04W 76/12; H04W 8/00; H04W 72/04; H04W 80/02
See application file for complete search history.

(56) References Cited

U.S. PATENT DOCUMENTS

| | | |
|---|---|---|
| 10,356,184 B2 | 7/2019 | Li et al. |
| 10,791,508 B2 | 9/2020 | Park et al. |
| 2018/0192471 A1 | 7/2018 | Li et al. |
| 2018/0262924 A1 | 9/2018 | Dao et al. |
| 2018/0309646 A1* | 10/2018 | Mustafiz ................ H04L 67/51 |
| 2019/0149365 A1 | 5/2019 | Chatterjee et al. |
| 2019/0253917 A1* | 8/2019 | Dao .................. H04W 28/0268 |
| 2019/0313468 A1* | 10/2019 | Talebi Fard .......... H04W 76/12 |
| 2019/0342851 A1 | 11/2019 | Shan et al. |
| 2020/0344576 A1* | 10/2020 | Li ........................ H04L 12/185 |
| 2021/0068172 A1* | 3/2021 | Jeong .................... H04W 76/10 |
| 2021/0219225 A1* | 7/2021 | Fukuoka ............... H04W 12/06 |
| 2022/0174482 A1* | 6/2022 | Wifvesson .......... H04W 12/033 |
| 2022/0191746 A1* | 6/2022 | Cai ........................ H04W 4/20 |

* cited by examiner

Primary Examiner — Andrew Wendell

(57) ABSTRACT

A wireless communication network serves a Protocol Data Unit (PDU) session type over a Radio Access Network (RAN). The wireless communication network comprises a Network Repository Function (NRF), Management and Orchestration (MANO) system, a User Plane Function (UPF), a RAN, and User Equipment (UEs). The NRF receives UPF requests for User Plane Functions (UPFs) that can serve the PDU session type over the RAN and responsively transfers UPF responses indicating other UPFs that cannot serve the PDU session type over the RAN. The NRF determines when the transfer of the UPF responses is excessive. In response, the NRF transfers an instantiation request to a Management and Orchestration (MANO) system to instantiate a new UPF that can serve the PDU session type over the RAN. The MANO system instantiates the new UPF. The new UPF serves the PDU session type to the UEs over the RAN.

20 Claims, 9 Drawing Sheets

WIRELESS COMMUNICATION NETWORK TO SERVE A PROTOCOL DATA UNIT (PDU) SESSION TYPE OVER A RADIO ACCESS NETWORK (RAN)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMFs), Session Management Functions (SMFs), User Plane Functions (UPFs), and Network Repository Functions (NRFs).

A wireless user device attaches to a wireless network core over a RAN. The wireless user device transfers a Protocol Data Unit (PDU) session request to the wireless network core. The wireless network core establishes a PDU session between the wireless user device and the external data network over the RAN. The PDU session is a data connection between the wireless user device and the external data network. A UPF in the wireless network core supports the PDU session over the RAN. Different types of UPFs support different types of PDU sessions. When the type of PDU session requested by the wireless user device is not supported by a UPF over the RAN, the wireless network core will not establish the PDU session. When the PDU session is not established, the wireless user device will hand over to another RAN where it reattempts to establish that type of PDU session. Wireless network cores ineffectively determine when RANs cannot serve PDU session types and inefficiently require wireless user devices to hand over when the PDU session types are not supported. Unfortunately, the wireless network cores do not effectively and efficiently mitigate the effects of unsupported PDU session types.

TECHNICAL OVERVIEW

A wireless communication network serves a Protocol Data Unit (PDU) session type over a Radio Access Network (RAN). The wireless communication network comprises a Network Repository Function (NRF), Management and Orchestration (MANO) system, a User Plane Function (UPF), and a RAN. The NRF receives UPF requests for User Plane Functions (UPFs) that can adequately serve the PDU session type over the RAN. The NRF responsively transfers UPF responses indicating other UPFs that cannot adequately serve the PDU session type over the RAN. The NRF determines when the transfer of the UPF responses is excessive for the PDU session type and the RAN. In response, the NRF transfers an instantiation request to a MANO system to instantiate a new UPF that can adequately serve the PDU session type over the RAN. The MANO system receives the instantiation request from the NRF and responsively instantiates the new UPF. The new UPF serves the PDU session type to User Equipment (UEs) over the RAN.

DETAILED DESCRIPTION

Figure 1:
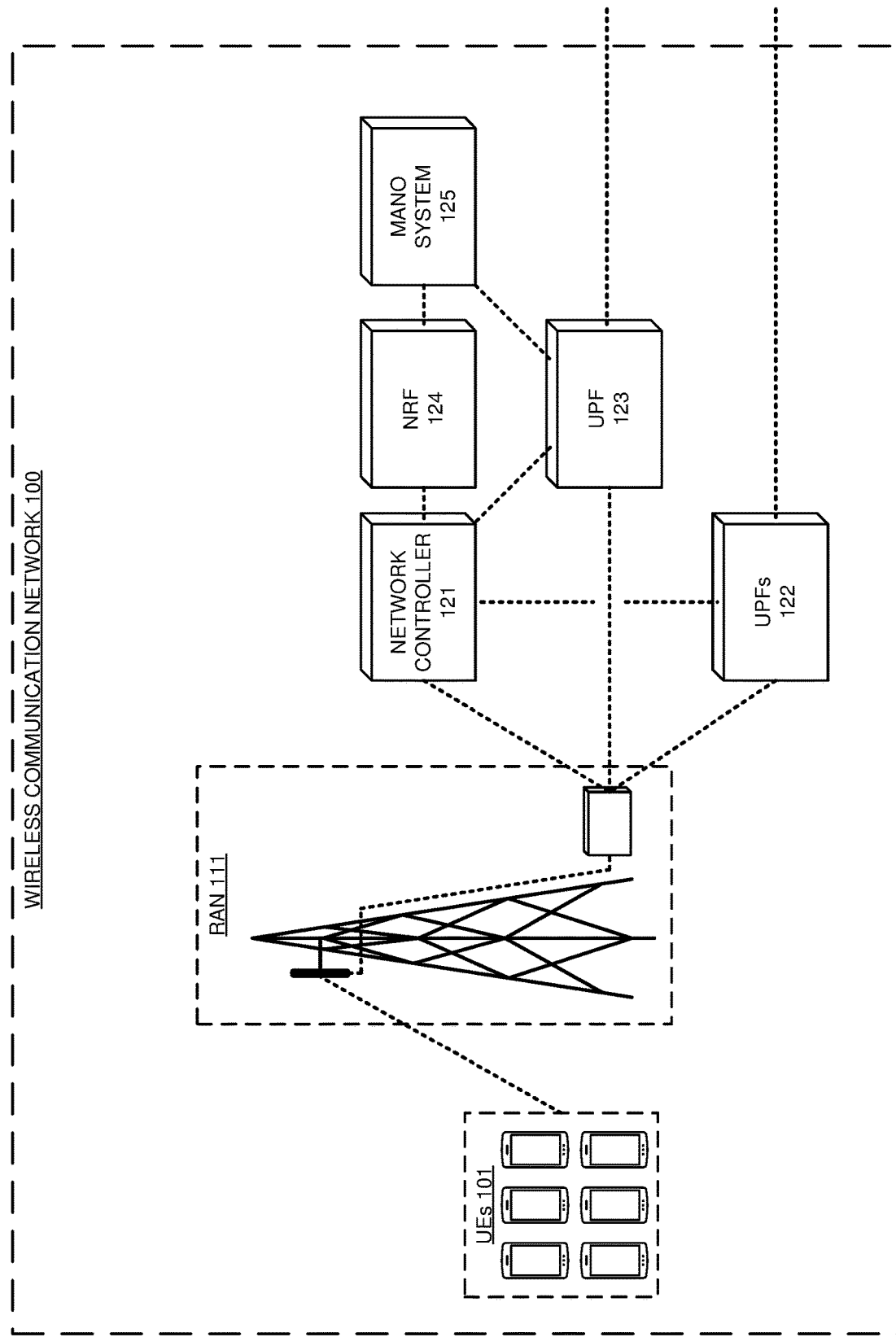
FIG. 1 illustrates a wireless communication network to serve a Protocol Data Unit (PDU) session type over a Radio Access Network (RAN).

FIG. 1 illustrates wireless communication network 100 to serve a Protocol Data Unit (PDU) session type over Radio Access Network (RAN) 111. Wireless communication network 100 delivers services to UEs 101 like internet-access, machine communications, media-streaming, or some other data communications product. Wireless communication network 100 comprises User Equipment (UEs) 101, RAN 111, network controller 121, User Plane Functions (UPFs) 122, UPF 123, Network Repository Function (NRF) 124, and Management and Orchestration (MANO) system 125.

Various examples of network operation and configuration are described herein. In some examples, NRF 124 receives UPF requests for UPFs that can adequately serve a PDU session type over RAN 111. NRF 124 responsively transfers UPF responses indicating UPFs 122 that cannot adequately serve the PDU session type over RAN 111. NRF 124 determines when the transfer of the UPF responses is excessive for the PDU session type and RAN 111. In response, NRF 124 transfers an instantiation request to MANO system 125 to instantiate UPF 123 that can adequately serve the PDU session type over RAN 111.

MANO system 125 receives the instantiation request from NRF 124 and responsively instantiates UPF 123. UPF 123 serves the PDU session type to UEs 101 over RAN 111. Advantageously, NRF 124 effectively determines when PDU session requests for a PDU session type are excessive for RAN 111 and efficiently drives MANO system 125 to instantiate UPF 123 that serves the PDU session type to UEs 101 over RAN 111. Thus, NRF 124 effectively and efficiently mitigates the effects of unsupported PDU session types.

UEs 101 and RAN 111 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. RAN 111, network functions 121-124, and MANO system 125 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UEs 101 comprise computers, phones, vehicles, sensors, robots, or other types of data appliances with wireless and/or wireline communication circuitry. RAN 111 is depicted as a tower but RAN 111 may use another mounting structure or no mounting structure at all. RAN 111 may comprise Fifth Generation (5G) RANs, LTE RANs, gNodeBs, eNodeBs, NB-IoT access nodes, LP-WAN base stations, wireless relays, WIFI hotspots, ENET access nodes, Bluetooth access nodes, and/or other wireless or wireline network transceivers. UEs 101 and RAN 111 comprise antennas, amplifiers, filters, modulation, analog/digital interfaces, microprocessors, software, memories, transceivers, bus circuitry, and the like. Network controller 121 comprises network functions like Access and Mobility Management (AMF) functions and Session Management Functions (SMFs). MANO system 125 comprises MANO applications like Virtual Network Function Manager (VNFM), Network Function Virtualization Orchestrator (NFVO), and Virtualized Infrastructure Manager (VIM). Network functions 121-124 and MANO system 125 comprise, microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
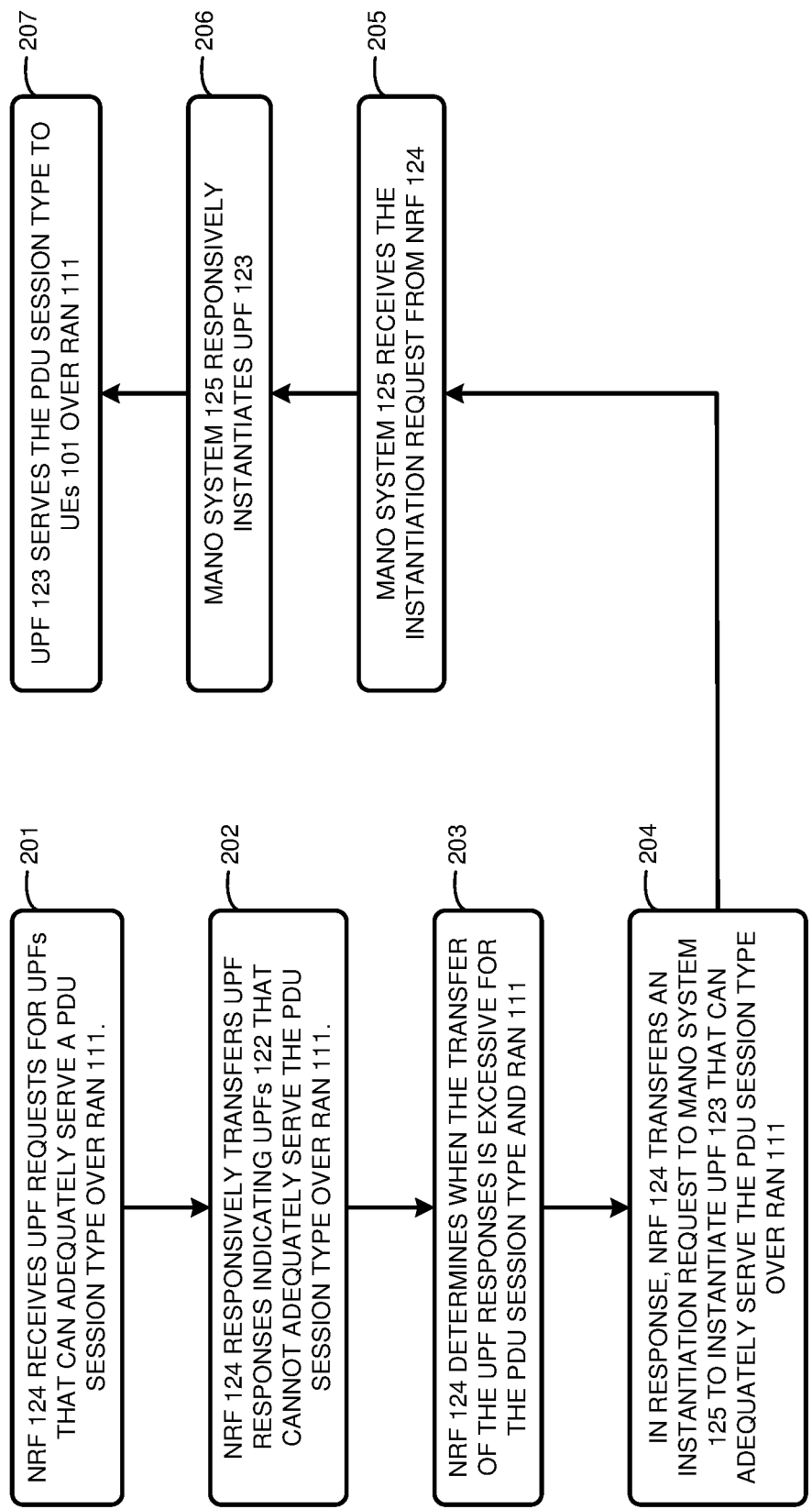
FIG. 2 illustrates an exemplary operation of the wireless communication network to serve the PDU session type over the RAN.

FIG. 2 illustrates an exemplary operation of wireless communication network 100 to serve a PDU session type over RAN 111. The operation may vary in other examples. NRF 124 receives UPF requests for UPFs that can adequately serve a PDU session type over RAN 111 (201). NRF 124 responsively transfers UPF responses indicating UPFs 122 that cannot adequately serve the PDU session type over RAN 111 (202). NRF 124 determines when the transfer of the UPF responses is excessive for the PDU session type and RAN 111 (203). For example, NRF 124 may determine that the number of UPF responses sent over a period of time that indicate UPFs 122 which cannot support the PDU session type over RAN 111 exceeds a UPF threshold. In response to the excessive UPF responses, NRF 124 transfers an instantiation request to MANO system 125 to instantiate UPF 123 that can adequately serve the PDU session type over RAN 111 (204). MANO system 125 receives the instantiation request from NRF 124 (205). MANO system 125 responsively instantiates UPF 123 (206). UPF 123 serves the PDU session type to UEs 101 over RAN 111 (207).

Figure 3:
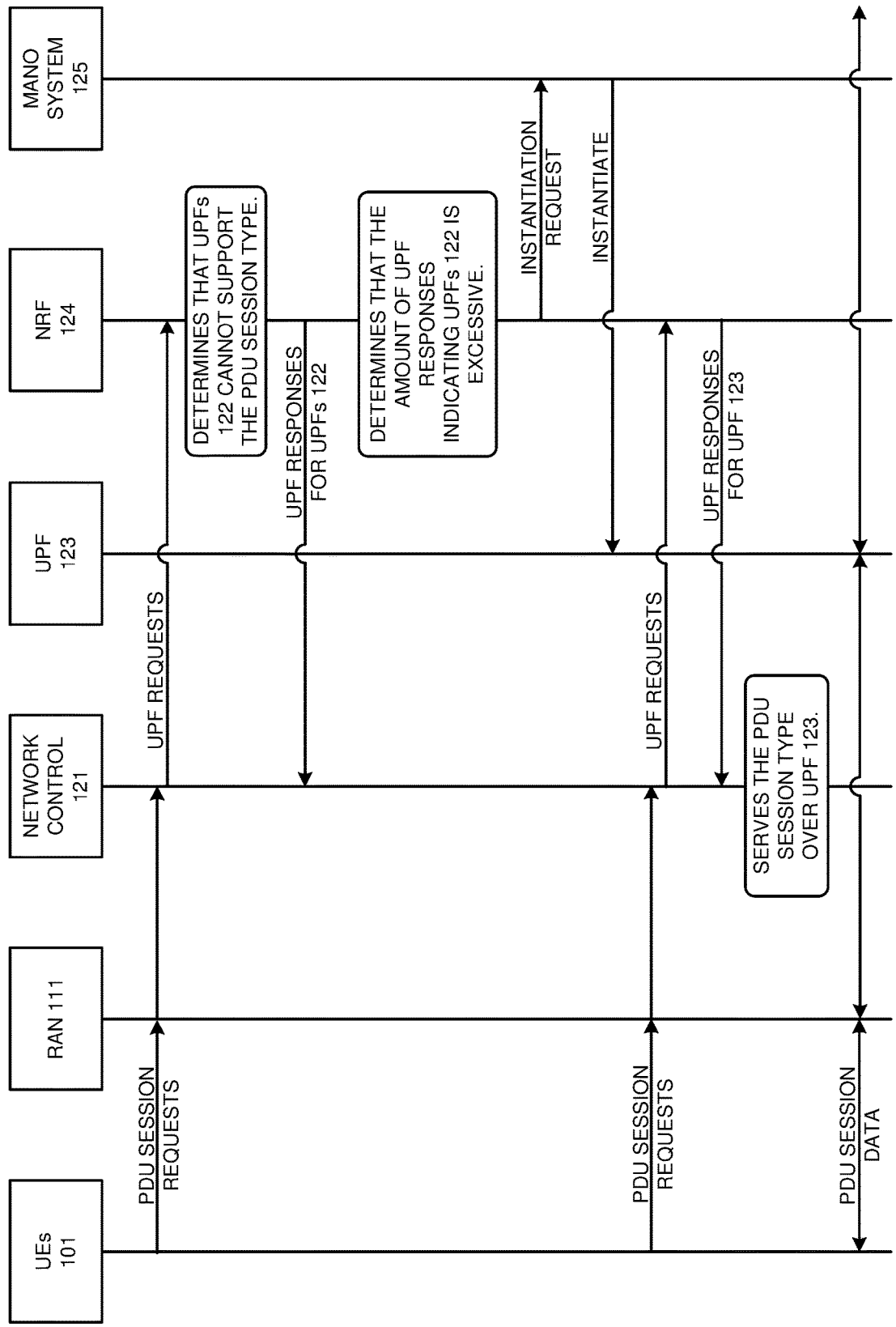
FIG. 3 illustrates another exemplary operation of the wireless communication network to serve the PDU session type over the RAN.

FIG. 3 illustrates an exemplary operation of wireless communication network 100 to serve a PDU session type over RAN 111. The operation may vary in other examples. UEs 101 transfer PDU session requests to network controller 121 over RAN 111. The PDU session requests specify a PDU session type. For example, the PDU session type may comprise a media streaming PDU session, a media conferencing PDU session, an Ultra Reliable Low Latency Communications (URLLC) PDU session, or some other type of PDU session. Network controller 121 transfers UPF requests to NRF 124 for a UPF that can serve the PDU session type requested by UEs 101. NRF 124 receives the UPF requests and determines that UPFs 122 cannot serve the requested PDU session type over RAN 111. NRF 124 transfers UPF responses that indicate UPFs 122 which cannot adequately serve the requested PDU session type to network controller 121.

NRF 124 determines that the amount of UPF responses that indicate UPFs 122 that cannot adequately serve the requested PDU session type over RAN 111 is excessive. For example, NRF 124 may host a data structure and determine that the rate of UPF responses that indicate inadequate UPFs 122 exceeds a UPF threshold. In response to the excessive UPF responses, NRF 124 transfers an instantiation request to MANO system 125 for MANO system 125 to instantiate UPF 123 which can serve the requested PDU session type over RAN 111. MANO system 125 instantiates UPF 123 that is able to serve the requested PDU session type over RAN 111.

UEs 101 transfer additional PDU session requests for the PDU session type to network controller 121 over RAN 111. Network controller 121 transfers UPF requests to NRF 124 for a UPF that can serve the PDU session type requested by UEs 101. NRF 124 receives the UPF requests and determines that UPF 123 can serve the PDU session type over RAN 111. NRF 124 transfers UPF responses that indicate UPF 123 to network controller 121. Network controller 121 establishes the requested type of PDU session for UEs 101 over RAN 111 and UPF 123. UEs 101 exchange PDU session data for the requested PDU session type with RAN 111. RAN 111 exchanges the PDU session data for the requested PDU session type with UPF 123. UPF 123 exchanges the PDU session data for the requested PDU session type with external data networks. In some examples, the operation repeats.

Figure 4:
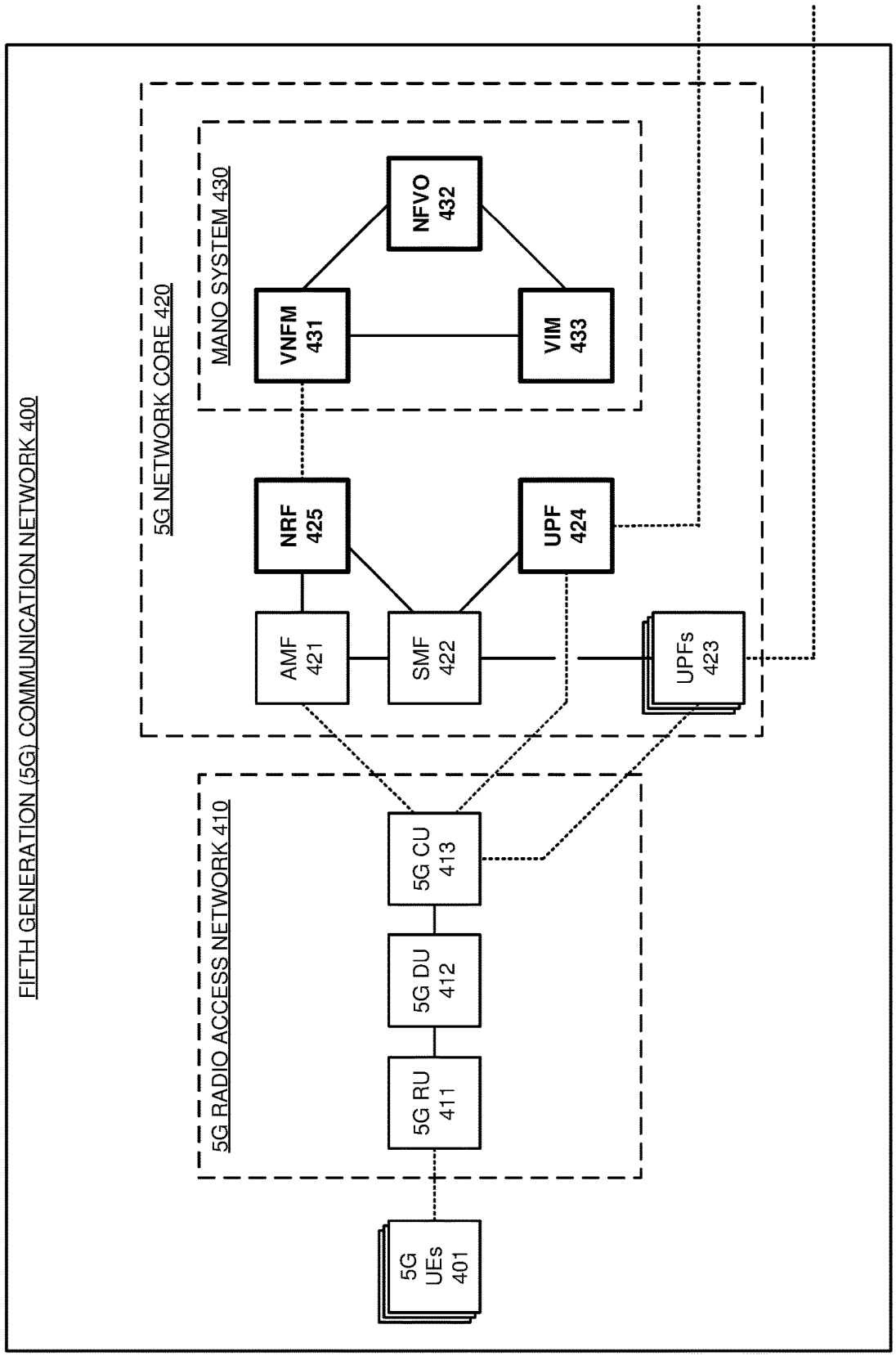
FIG. 4 illustrates a Fifth Generation (5G) communication network to serve a PDU session type over a 5G RAN.

FIG. 4 illustrates Fifth Generation (5G) communication network 400 to serve a Protocol Data Unit (PDU) session type over 5G Radio Access Network (RAN) 410. 5G communication network 400 comprises an example of wireless communication network 100, although network 100 may differ. 5G communication network 400 comprises 5G UEs 401, 5G RAN 410, and 5G network core 420. 5G RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, User Plane Function (UPFs) 423, UPF 424, Network Repository Function (NRF) 425, and Management and Orchestration (MANO) system 430. MANO system 430 comprises Virtual Network Function Manager (VNFM) 431, Network Function Virtualization Orchestrator (NFVO) 432, and Virtualized Infrastructure Manager (VIM) 433. Other network functions and network elements are typically present in network core 420 but are omitted for clarity.

UEs 401 wirelessly attach to RU 411 and transfer attachment signaling to CU 413 over RU 411 and DU 412. CU 413 transfers registration requests for UEs 401 to AMF 421. AMF 421 interacts other network functions to authenticate and authorize UEs 401 for wireless data services. Responsive to the authentications and authorizations, AMF 421 interacts with other network functions to generate UE context for UEs 401. The UE context comprises Quality-of-Service (QoS) metrics, slice identifiers, network addresses, and the like. AMF 421 transfers the UE context for UEs 401 to CU 413. CU 413 transfers the UE context to UEs 401 over DU 412 and RU 411. CU 413 controls DU 412 and RU 411 to serve UEs 401. UEs 401 exchange user signaling with AMF 421 and SMF 422 over RU 411, DU 412, and CU 413. UEs 401 exchange user data with UPFs 423 over RU 411, DU 412, and CU 413.

UEs 401 transfer PDU session requests to initiate a PDU session type to CU 413 over DU 412 and RU 411. The PDU session type comprises a media streaming PDU session, a media conferencing PDU session, an Ultra Reliable Low Latency Communications (URLLC) PDU session, or some other type of PDU session. CU 413 transfers the PDU session requests to AMF 421. AMF 421 directs SMF 422 to select a UPF to serve UEs 401 the PDU session type. SMF 422 determines that it does not currently have access to a UPF that can serve the requested PDU session. In response, SMF 422 transfers UPF requests to NRF 425 for a UPF that can support the requested PDU session type over RAN 410. NRF 425 identifies UPFs 423 that are available to serve RAN 410. NRF 425 determines that UPFs 423 and RAN 410 are not in the service area for the requested PDU session type. The service area comprises tracking areas of UPFs and RANs which can serve the PDU session type. Typically, a tracking area comprises one or more RANs that can communicate with a UPF. In some examples, RAN 410 and UPFs 423 comprise a tracking area(s) while RAN 410 and UPF 424 comprise another tracking area. NRF 425 transfers UPF responses to SMF 422 that indicate UPFs 423 are available to serve UEs 401 over RAN 410 and that UPFs 423 and RAN 410 are not in the service area for the requested PDU session type. SMF 422 receives the UPF responses and notifies AMF 421 that the requested PDU session type is not supported. AMF 421 notifies UEs 401 over RAN 410 that the requested PDU session type is not available over RAN 410.

NRF 425 determines the number of UPF responses sent over a period of time that indicate UPFs 423 which cannot serve the requested PDU session type over RAN 410. NRF 425 determines when the UPF responses indicating UPFs 423 that cannot support the requested PDU session type over RAN 410 are excessive. NRF 425 hosts a data structure and determines when the number of UPF responses sent over the period of time exceeds a UPF threshold. When the UPF threshold is exceeded, NRF 425 determines that the number of UPF responses is excessive. In response to the excessive UPF responses, NRF 425 transfers a UPF instantiation request to VNFM 431 to instantiate a UPF that can serve the requested PDU session type to UEs 401 over RAN 410. VNFM 431 receives the instantiation request and transfers the instantiation request to NFVO 432. NFVO 432 approves the instantiation request and notifies VNFM 431. NFVO 432 drives VIM 433 to instantiate UPF 424 in the service area for the requested UPF session type. VIM 433 drives network elements in 5G network core 420 to instantiate UPF 424. VNFM 431 notifies NRF 425 of the instantiation. NRF 425 correlates UPF 424 with the PDU session type and with RAN 410. NRF 425 adds UPF 424 and RAN 410 to the service area for the PDU session type. In some examples, NRF 425 notifies SMF 422 of UPF 424's instantiation before receiving additional UPF requests for a UPF that can support the requested PDU session type.

UEs 401 transfer additional PDU session requests for the PDU session type to CU 413 over DU 412 and RU 411. CU 413 transfers the PDU session requests to AMF 421. AMF 421 directs SMF 422 to establish the PDU sessions for the PDU session type over RAN 410. In response, SMF 422 transfers UPF requests to NRF 425 for a UPF that can support the requested PDU session type over RAN 410. NRF 425 identifies UPF 424 that is available to serve RAN 410. NRF 425 determines that UPF 424 and RAN 410 are in the service area for the requested PDU session type. NRF 425 transfers UPF responses to SMF 422 that indicate UPF 424 which can support the requested PDU session type over RAN 410. SMF 422 receives the UPF responses and selects UPF 424 to serve the requested PDU session type to UEs 401 over RAN 410. SMF 422 notifies AMF 421 that UPF 424 was selected. AMF 421 transfers UE context that indicates UPF 424 to UEs 401 over RAN 410. UEs 401 use the UE context initiate the PDU sessions over RAN 410. UPF 424 exchanges PDU session data for the PDU session type with UEs 401 over RAN 410. UPF 424 exchanges PDU session data for the PDU session type with external data networks.

In some examples, NRF 425 determines when the amount UPF requests for UPF 424 are minimal. NRF 425 determines the number of UPF request sent over a period of time for UPF 424 to serve the requested PDU session type. When the number of UPF requests sent over the period of time falls below a UPF threshold, NRF 425 determines that UPF requests are minimal. In response to the minimal UPF requests, NRF 425 transfers a UPF termination request to VNFM 431 to terminate UPF 424. VNFM 431 receives the termination request and transfers the termination request to NFVO 432. NFVO 432 approves the termination request and notifies VNFM 431. NFVO 432 drives VIM 433 to terminate UPF 424. In response, VIM 433 drives 5G network core 420 to terminate UPF 424. VNFM 431 notifies NRF 425 of the termination. NRF 425 decorrelates UPF 424 with the PDU session type and with RAN 410. NRF 425 removes UPF 424 and RAN 410 from the service area for the PDU session type.

In some examples, once UPF 424 has been instantiated, NFR 425 determines a period of time when the amount of UPF requests for UPF 424 are minimal and another period of time when the amount of UPF requests for UPF 424 are excessive. For example, NRF 425 may determine that UPF requests for UPF 424 to serve the requested PDU session type over RAN 410 are minimal during weekdays and excessive during the weekend. During the period of time when requests are minimal, NFR 425 transfers a UPF standby request to VNFM 431 to put UPF 424 in standby mode. The standby mode comprises a UPF low-power mode, a UPF low/no signaling mode, and/or some other type of UPF power saving mode. VNFM 431 receives the UPF standby request and transfers the UPF standby request to NFVO 432. NFVO 432 approves the UPF standby request and notifies VNFM 431. NFVO 432 drives VIM 433 to put UPF 424 in standby mode. In response, VIM 433 drives 5G network core 420 to put UPF 424 in standby mode. Note that when UPF 424 is in standby mode, UPF 424 and RAN 410 remain in the service area for the requested PDU session type but UPF 424 is not available to serve UEs 401 the requested PDU session type over RAN 410. During the period of time when requests are excessive, NFR 425 transfers a UPF activation request to VNFM 431 to activate UPF 424 out of standby mode. VNFM 431 receives the UPF activation request and transfers the request to NFVO 432. NFVO 432 approves the UPF activation request and notifies VNFM 431. NFVO 432 drives VIM 433 to activate UPF 424 out of standby mode. In response, VIM 433 drives 5G network core 420 to active UPF 424 out of standby mode. Note that when UPF 424 has been activated out of standby mode, UPF 424 again becomes available to serve UEs 401 the requested PDU session type over RAN 410.

Figure 5:
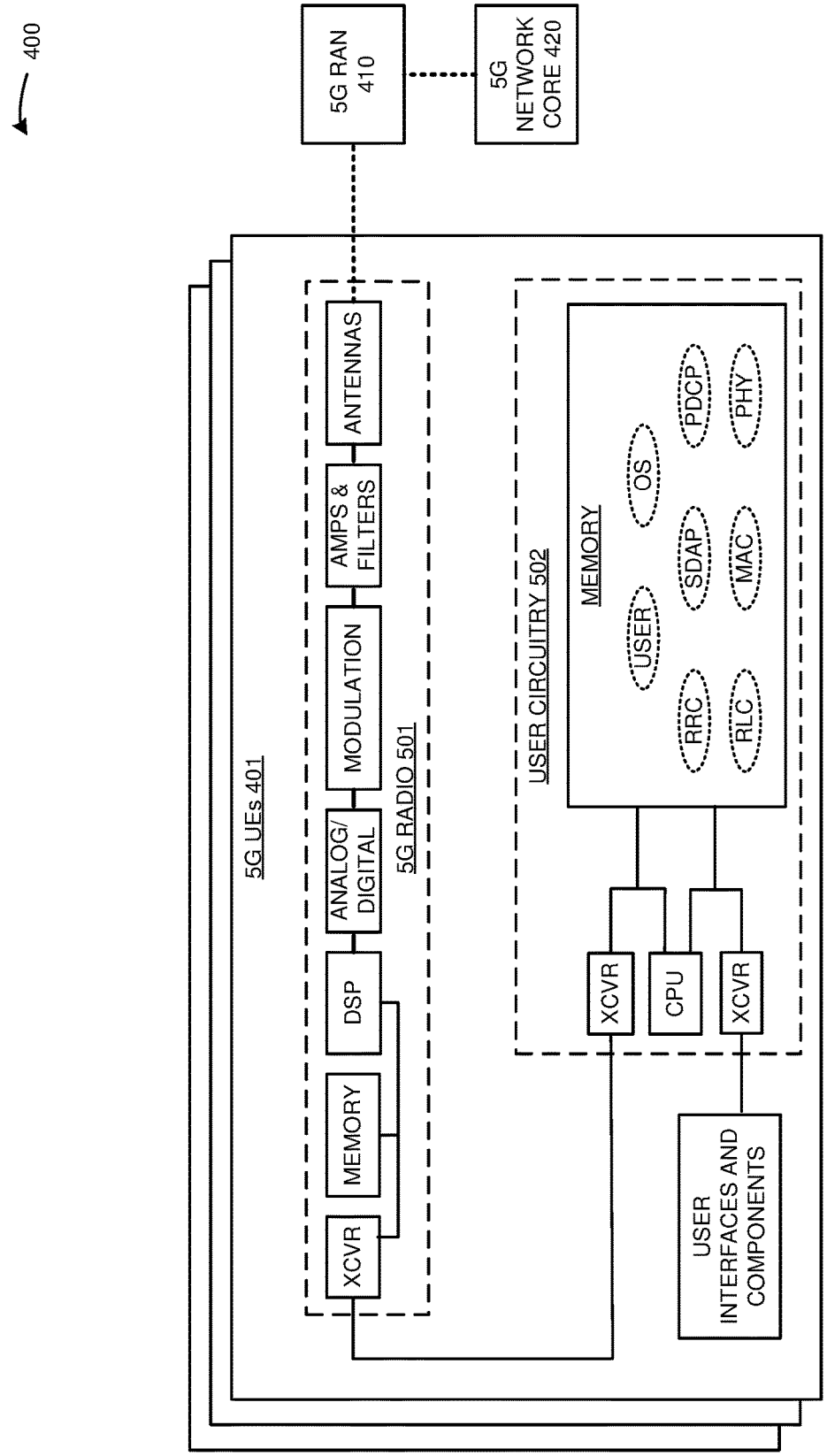
FIG. 5 illustrates 5G User Equipment (UEs) in the 5G communication network.

FIG. 5 illustrates 5G UEs 401 that are served a PDU session type over 5G communication network 400. UEs 401 comprises an example of UEs 101, although UEs 101 may differ. UEs 401 comprises 5G radio 501 and user circuitry 502. Radio 501 comprises antennas, amplifiers, filters, modulation, analog-to-digital interfaces, Digital Signal Processers (DSP), memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 510 over a 5GNR link. A transceiver in radio 501 is coupled to a transceiver in user circuitry 502. A transceiver in user circuitry 502 is typically coupled to the user interfaces and components like displays, controllers, and memory.

In radio 501, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data. In radio 501, the DSP processes the uplink 5GNR symbols to generate corresponding digital signals for the analog-to-digital interfaces. The analog-to-digital interfaces convert the digital uplink signals into analog uplink signals for modulation. Modulation up- converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 410 that transport the uplink 5GNR signaling and data.

In some examples, the RRCs in UEs 401 transfer PDU session requests to 5G network core 420 over 5G RAN 410 to establish PDU sessions with external data networks over 5G network core 420. The PDU session requests each specify a type of PDU session. The SDAPs in UEs 401 exchange PDU session data for PDU sessions with 5G network core 420 over 5G RAN 410.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
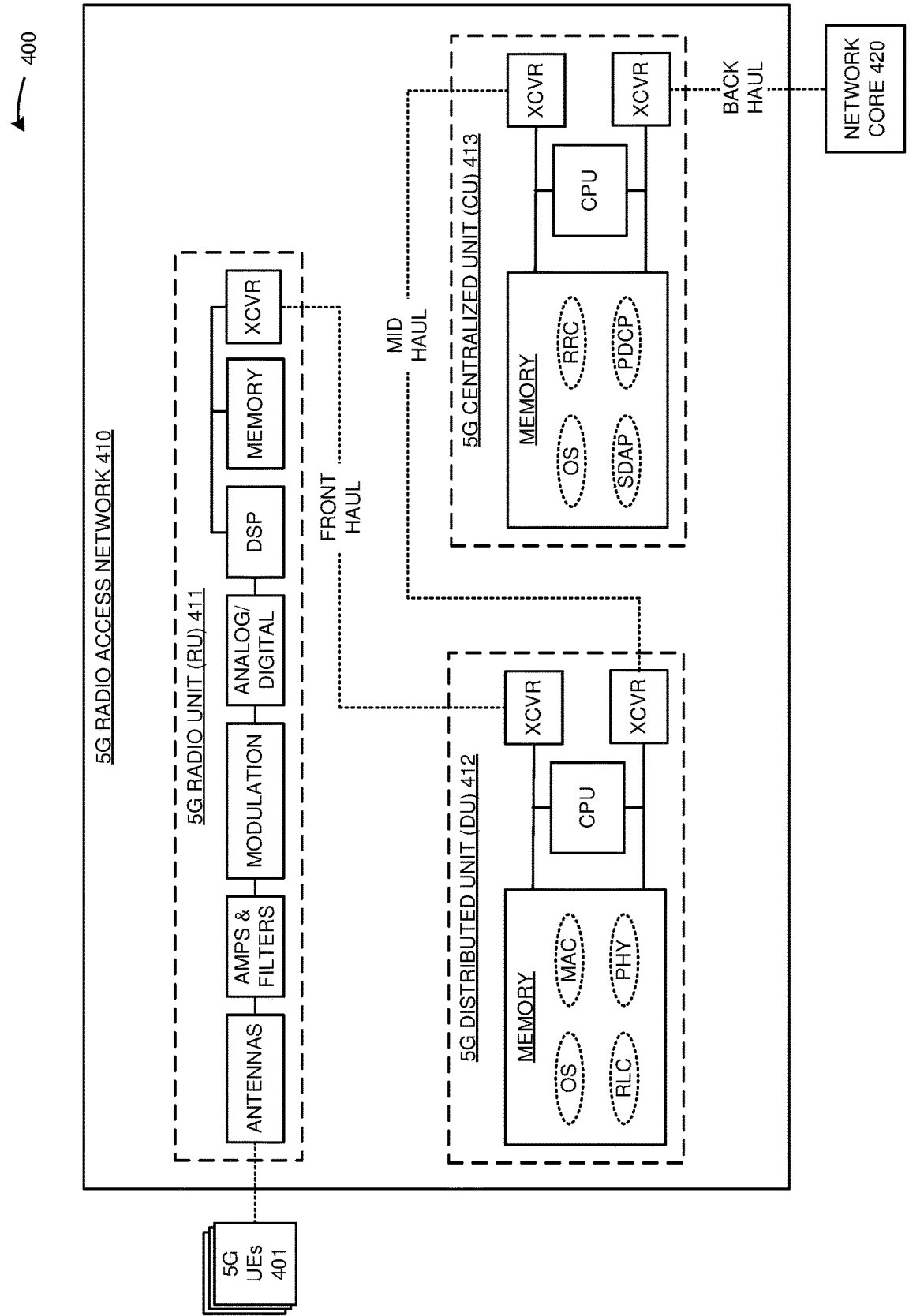
FIG. 6 illustrates the 5G RAN in the 5G communication network.

FIG. 6 illustrates 5G RU 411, 5G DU 412, and 5G CU 413 that serve a PDU session type to UEs 401. RU 411, DU 412, and CU 413 comprise an example of RAN 111, although RAN 111 may differ. RU 411 comprises antennas, amplifiers, filters, modulation, analog-to-digital interfaces, DSP, memory, and transceivers (XCVRs) that are coupled over bus circuitry. UEs 401 are wirelessly coupled to the antennas in RU 411 over 5GNR links. Transceivers in 5G RU 411 are coupled to transceivers in 5G DU 412 over fronthaul links like enhanced Common Public Radio Interface (eCPRI). The DSP in RU 411 executes its operating system and radio applications to exchange 5GNR signals with UEs 401 and to exchange 5GNR data units with DU 412.

For the uplink, the antennas receive wireless signals from UEs 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSP. The DSP transfers corresponding 5GNR symbols to DU 412 over the transceivers.

For the downlink, the DSP receives downlink 5GNR symbols from DU 412. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UEs 401 that transport the downlink 5GNR signaling and data.

DU 412 comprises memory, CPU, and transceivers that are coupled over bus circuitry. The memory in 5G DU 412 stores operating systems and 5GNR network applications like PHY, MAC, and RLC. CU 413 comprises memory, CPU, and transceivers that are coupled over bus circuitry. The memory in CU 413 stores an operating system and 5GNR network applications like PDCP, SDAP, and RRC. A transceiver in 5G DU 412 is coupled to a transceiver in RU 411 over front-haul links. A transceiver in DU 412 is coupled to transceivers in CU 413 over mid-haul links. A transceiver in CU 413 is coupled to network core 420 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
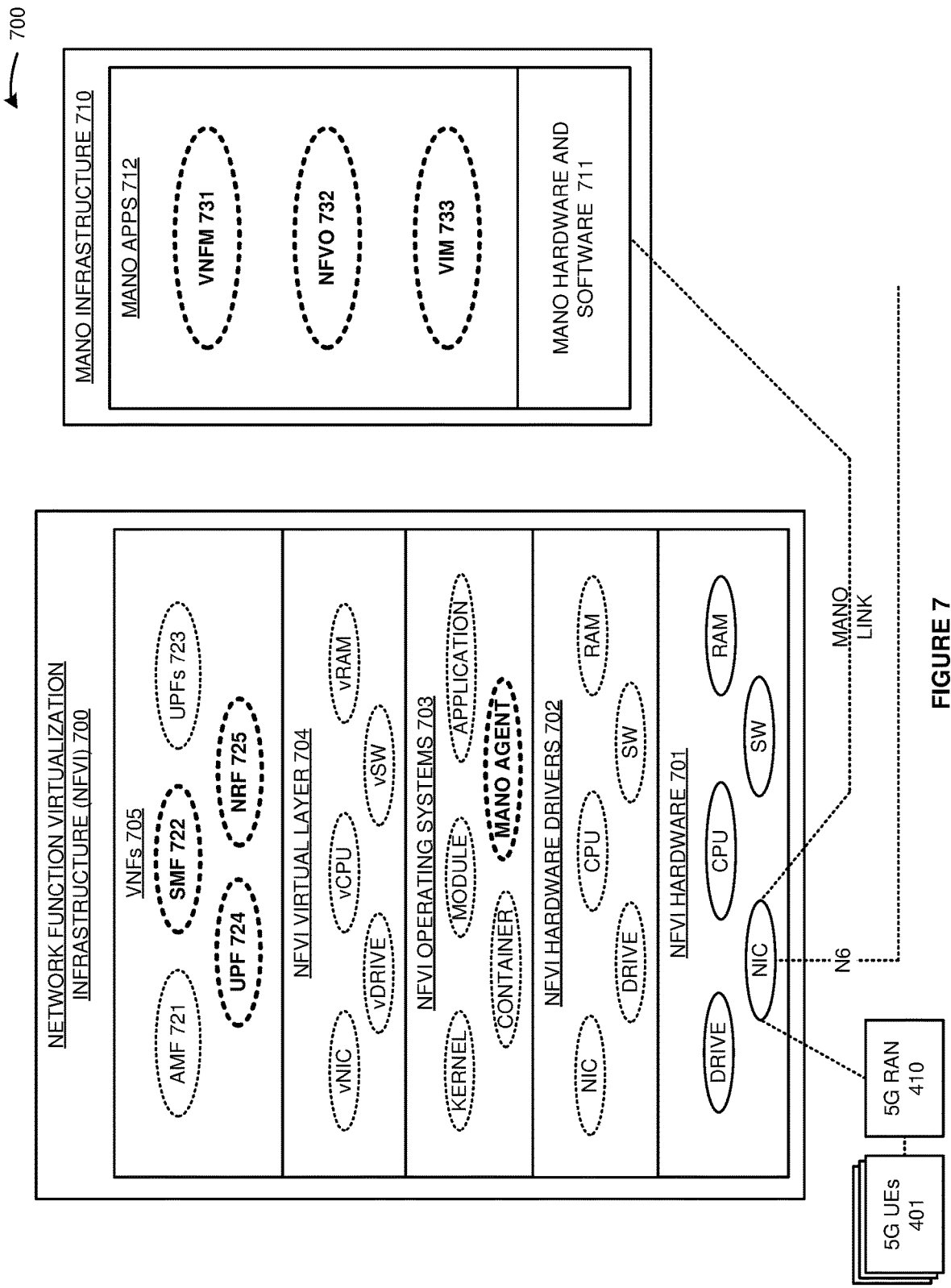
FIG. 7 illustrates a Network Function Virtualization Infrastructure (NFVI) and a Management and Orchestration (MANO) infrastructure in the 5G communication network.

FIG. 7 illustrates Network Function Virtualization Infrastructure (NFVI) 700 and MANO infrastructure 710 in 5G communication network 400. NFVI 700 comprises an example of network functions 121-124, although functions 121-124 may vary from this example. MANO architecture 710 comprises an example of MANO system 125, although MANO system 125 may vary from this example. NFVI 700 comprises Network Function Virtualization Infrastructure (NFVI) hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, MANO agents, and the like. NFVI virtual layer 704 comprises vNIC, vCPU, vRAM, vDRIVE, and vSW. NFVI VNFs 705 comprise AMF 721, SMF 722, UPFs 723, UPF 724, and NRF 725. Other VNFs and network elements like Authentication Server Function (AUSF), Policy Control Function (PCF), Network Slice Selection Function (NSSF), Unified Data Manager (UDM), Unified Data Registry (UDR), and Network Exposure Function (NEF) are typically present but are omitted for clarity.

MANO infrastructure 710 comprises MANO hardware and software 711 and MANO applications (APPS) 712. MANO hardware and software 711 comprises MANO hardware, MANO hardware drivers, MANO operating systems, and a MANO virtual layer. The MANO hardware comprises NICs, CPU, RAM, flash/disk drives, and data switches. The MANO hardware drivers comprise software that is resident in the NIC, CPU, RAM, flash/disk drives, and data switches. The MANO operating systems comprise kernels, modules, applications, containers, hypervisors, and the like. The MANO virtual layer comprises vNIC, vCPU, vRAM, virtual flash/disk drives, and virtual data switches. MANO applications 712 comprise VNFM 731, NFVO 732, and VIM 733. Other MANO applications are typically present but are omitted for clarity.

NFVI 700 and MANO infrastructure 710 may be located at a single site or be distributed across multiple geographic locations. The NIC in NFVI hardware 701 is coupled to 5G RAN 410, to external systems, and to a NIC in MANO hardware and software 711 over a MANO link. NFVI hardware 701 executes NFVI hardware drivers 702, NFVI operating systems 703, NFVI virtual layer 704, and NFVI VNFs 705 to form AMF 421, SMF 422, UPFs 423, UPF 424, and NRF 425. The MANO hardware in MANO hardware and software 711 executes the MANO hardware drivers, MANO operating systems, MANO virtual layer, and MANO applications 712 to form VNFM 431, NFVO 432, and VIM 433.

Figure 8:
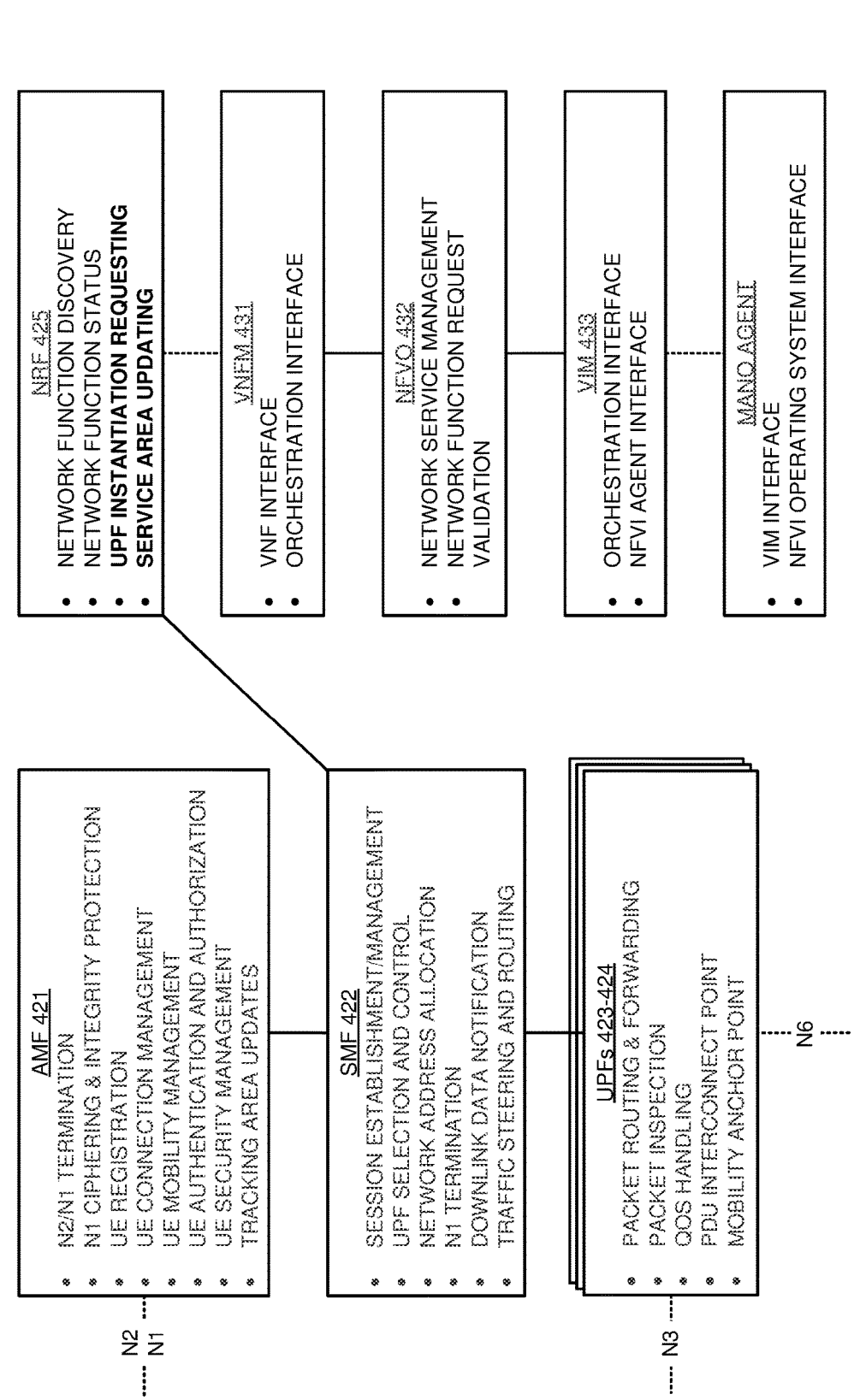
FIG. 8 further illustrates the NFVI and MANO infrastructure in the 5G communication network.

FIG. 8 further illustrates Network Function Virtualization Infrastructure (NFVI) 700 in 5G communication network 400. AMF 421 performs N2 termination, N1 termination, UE ciphering & integrity protection, UE registration and connection, UE connection/mobility management, UE authentication and authorization, and UE short messaging. SMF 422 performs session establishment and management, network address allocation, N1 termination, downlink data notification, and traffic steering and routing. UPFs 423-424 perform packet routing & forwarding, packet inspection, QoS handling, PDU interconnection, and mobility anchoring. NRF 425 performs network function discovery, network function status monitoring, UPF instantiation requesting, and service area updating. VNFM 431 provides a VNF interface and an orchestration interface. NFVO 432 performs network service management and network function request validation. VIM 433 provides an orchestration interface and an NFVI agent interface. The MANO agent provides a VIM interface and an NFVI operating system interface.

UEs 401 attach to AMF 421. AMF 421 receives PDU session requests from UEs 401 to establish URLLC PDU sessions over RAN 410. In this example, the PDU session type comprises a URLLC PDU session however in other examples, the PDU session type may be different. AMF 421 drives SMF 422 to establish the URLLC PDU sessions for UEs 401. SMF 422 determines that it does not have access to a UPF that can support a URLLC PDU session. In response, SMF 422 transfers UPF requests to NRF 425 for a UPF that can serve URLLC PDU sessions to UEs 401. NRF 425 identifies UPFs 423 which currently serve RAN 410. NRF 425 determines that UPFs 423 and RAN 410 are not in the service area for URLLC PDU sessions. NRF 425 transfers UPF responses to SMF 422 that indicate UPFs 423 are available and that indicate UPFs 423 and RAN 410 are not in the service area for URLLC PDU sessions. SMF 422 receives the UPF responses. SMF 422 notifies AMF 421 that URLLC PDU sessions are not supported over RAN 410. AMF 421 notifies UEs 401 that URLLC PDU sessions are not available over RAN 410.

NRF 425 determines the frequency of transferred UPF responses that indicate UPFs 423 and RAN 410 are not in the URLLC PDU session service area. NRF 425 determines that the frequency of the UPF responses exceeds a UPF threshold and in response, determines that the frequency of UPF responses is excessive. NRF 425 transfers a UPF instantiation request to VNFM 431 to instantiate a UPF that can serve URLLC PDU sessions to UEs 401 over RAN 410. VNFM 431 receives the instantiation request and transfers the instantiation request to NFVO 432. NFVO 432 approves the instantiation request and notifies VNFM 431. NFVO 432 drives VIM 433 to instantiate UPF 424 which support URLLC PDU sessions over RAN 410. VIM 433 communicates the MANO agent over the MANO link to instantiate UPF 424. The MANO agent interacts with the NFVI operating systems to instantiate UPF 424. VNFM 431 notifies NRF 425 of the instantiation. NRF 425 adds UPF 424 and RAN 410 to the URLLC PDU session service area. For example, UPF NRF 425 may update the URLLC PDU session service area to include the tracking that comprises UPF 424 and RAN 410.

UEs 401 transfer additional PDU session requests to initiate URLLC PDU sessions to AMF 421. AMF 421 directs SMF 422 to establish URLLC PDU sessions for UEs 401 over RAN 410. SMF 422 transfers UPF requests to NRF 425 for a UPF that can support URLLC PDU sessions over RAN 410. NRF 425 identifies that UPF 424 is available to serve RAN 410. NRF 425 determines that UPF 424 and RAN 410 are in the URLLC PDU session service area. NRF 425 transfers UPF responses to SMF 422 that indicate UPF 424. SMF 422 receives the UPF responses and selects UPF 424 to establish the URLLC PDU sessions over RAN 410. SMF 422 notifies AMF 421 that UPF 424 was selected. AMF 421 transfers UE context that indicates UPF 424 to UEs 401 to establish the PDU sessions over RAN 410. UPF 424 exchanges URLLC PDU session data with UEs 401 over RAN 410. UPF 424 exchanges URLLC PDU session data with external data networks.

Figure 9:
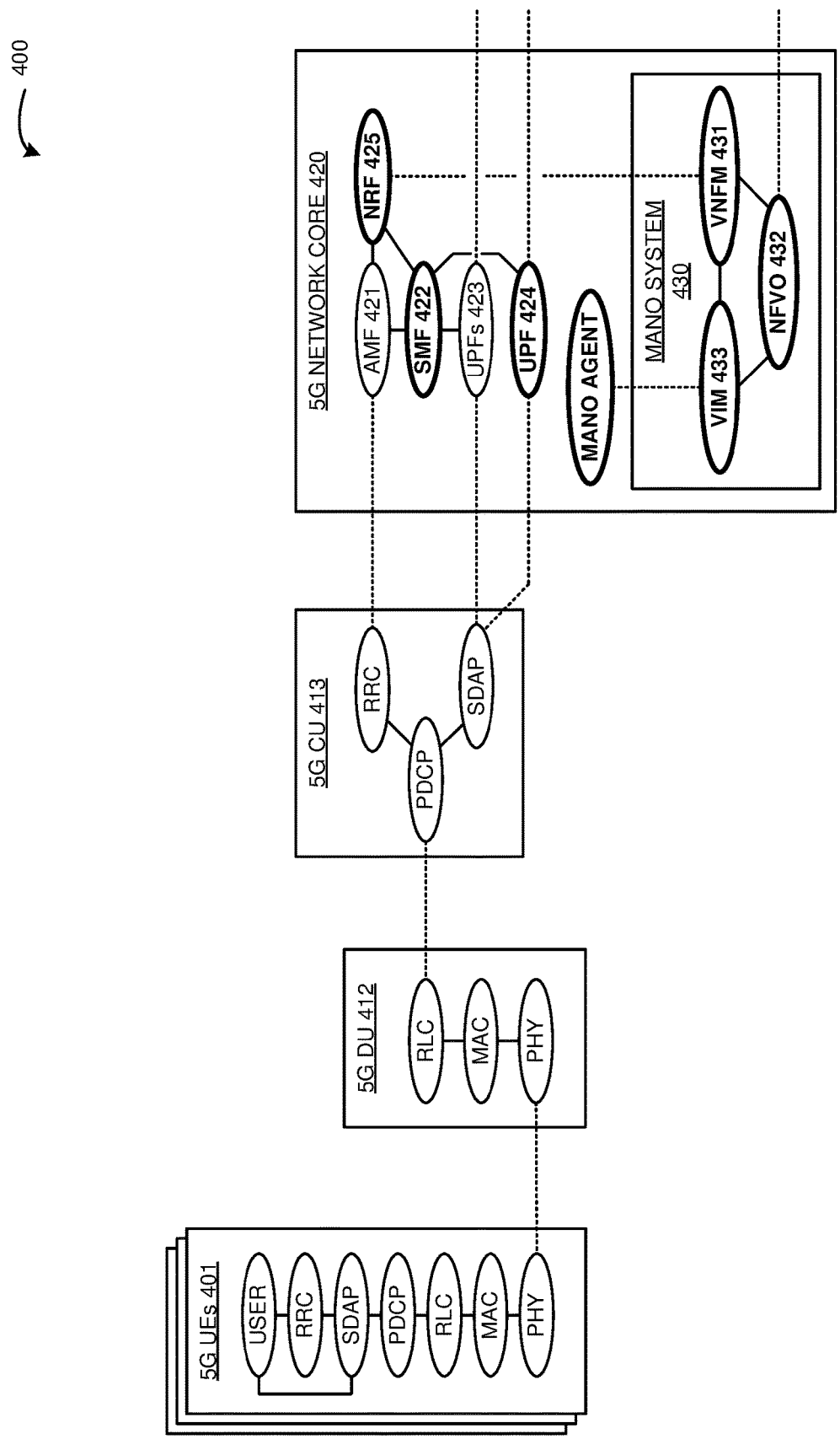
FIG. 9 illustrates an exemplary operation of the 5G communication network to serve a PDU session type over the 5G RAN.

FIG. 9 illustrates an exemplary operation of 5G communication network 400 to serve a PDU session type to UEs 401 over RAN 410. The operation may vary in other examples. In this example, the PDU session type comprises a media streaming PDU session, however in other examples, the PDU session type may differ.

The RRCs in UEs 401 wirelessly attach to the RRC in CU 413 over the PDCPs, RLCs, MACs, and PHYs. The RRC in CU 413 transfers registration requests for UEs 401 to AMF 421. AMF 421 interacts other network functions to authenticate and authorize UEs 401 for wireless data services. Responsive to the authentications and authorizations, AMF 421 interacts with other network functions to generate UE context for UEs 401 to establish data sessions with 5G network core 420. AMF 421 transfers the UE context for UEs 401 to the RRC in CU 413. The RRC in CU 413 transfers the UE context to UEs 401 over the PDCPs, RLCs, MACs, and PHYs. The RRC in CU 413 controls the SDAP, PDCP, RLC, MAC, and PHY in CU 413 and DU 412 to serve UEs 401. The RRCs in UEs 401 exchange user signaling with the RRC in CU 413 over the PDCPs, RLCs, MACs, and PHYs. The RRC in CU 413 exchanges the user signaling with AMF 421 and SMF 422. The SDAPs in UEs 401 exchange user data with the SDAP in CU 413 over the PDCPs, RLCs, MACs, and PHYs. The SDAP in CU 413 exchanges the user data with UPFs 423.

User applications in UEs 401 execute and the RRCs in UEs 401 responsively transfer PDU session requests for media conferencing PDU sessions to the RRC in CU 413 over the PDCPs, RLCs, MACs, and PHYs. The RRC in CU 413 transfers the PDU session requests to AMF 421. AMF 421 directs SMF 422 to serve UEs 401 with the media conferencing PDU sessions. SMF 422 determines that it does not have an available UPF that can establish the media conferencing PDU sessions. In response, SMF 422 transfers UPF requests to NRF 425 to discover a UPF that can support media conferencing PDU sessions over RAN 410. NRF 425 identifies UPFs 423 that are available to serve RAN 410. NRF 425 determines that UPFs 423 and RAN 410 are not in the media conferencing PDU session service area. NRF 425 transfers UPF responses to SMF 422 that indicate UPFs 423 can serve UEs 401 over RAN 410 and that indicate UPFs 423 and RAN 410 are not in the media conferencing PDU session service area. SMF 422 receives the UPF responses and notifies AMF 421 that the media conferencing PDU sessions are not supported over RAN 410. AMF 421 transfers notifications that indicate the media conferencing PDU sessions are not supported to the RRC in CU 413. The RRC in CU 413 transfers the notifications to the RRCs in UEs 401 over the PDCPs, RLCs, MACs, and PHYs.

NRF 425 determines the rate of transferred UPF responses that indicate UPFs 423 and RAN 410 are not in the media conferencing PDU session service area. NRF 425 determines when the rate of the transferred UPF responses indicating UPFs 423 and RAN 410 exceeds a UPF threshold. When the rate of transferred UPF responses exceeds the UPF threshold, NRF 425 determines that the rate of UPF responses is excessive. In response, NRF 425 transfers a UPF instantiation request to VNFM 431 to instantiate a media conferencing capable UPF for RAN 410. VNFM 431 transfers the instantiation request to NFVO 432. NFVO 432 accepts the instantiation request and notifies VNFM 431. NFVO 432 drives VIM 433 to instantiate UPF 424 which can serve media conferencing PDU sessions to UEs 401 over RAN 410. VIM 433 communicates with the MANO agent over a MANO link to instantiate UPF 424. The MANO agent interacts with operating systems in 5G network core 420 to instantiate UPF 424. VNFM 431 notifies NRF 425 of the instantiation. NRF 425 adds UPF 424 and RAN 410 to the media conferencing PDU session service area.

User applications in UEs 401 execute and the RRCs in UEs 401 transfer additional PDU session requests to initiate media conferencing PDU sessions to the RRC in CU 413 over the PDCPs, RLC, MACs, and PHYs. The RRC in CU 413 transfers the PDU session requests to AMF 421. AMF 421 directs SMF 422 to establish media conferencing PDU sessions over RAN 410 for UEs 401. SMF 422 transfers UPF requests to NRF 425 for a UPF that can support media conferencing PDU sessions over RAN 410. NRF 425 identifies UPF 424 that is available to serve RAN 410. NRF 425 determines that UPF 424 and RAN 410 are in the media conferencing PDU session service area. NRF 425 transfers UPF responses that indicate UPF 424 to SMF 422. SMF 422 receives the UPF responses and selects UPF 424 to serve the media conferencing PDU sessions over RAN 410. SMF 422 notifies AMF 421 of the selection. AMF 421 transfers UE context that indicates UPF 424 to the RRC in CU 413. The RRC in CU 413 transfers the UE context to the RRCs in UEs 401 over the PDCPs, RLCs, MACs, and PHYs. The RRCs in UEs 401 use the UE context to initiate the media conferencing PDU sessions over RAN 410. AMF 421 interacts with SMF 422 to serve the media conferencing PDU sessions to UEs 401 over RAN 410 and UPF 424. The SDAPs in UEs 401 exchange media conferencing PDU session data with the SDAP in CU 413 over the PDCPs, RLCs, MACs, and PHYs. The SDAP in CU 413 exchanges the media conferencing PDU session data with UPF 424. UPF 424 exchanges media conferencing PDU session data with external data networks.

NRF 425 determines the rate of UPF requests for UPF 424 to serve the media conferencing PDU session over RAN 410. NRF 425 determines when the rate of UPF requests for UPF 424 falls below a UPF threshold. When the rate of UPF requests for UPF 424 falls below the UPF threshold, NRF 425 determines that the rate of UPF requests is minimal. In response to the minimal UPF requests, NRF 425 transfers a UPF termination request to VNFM 431 to terminate UPF 424. VNFM 431 receives the termination request and transfers the termination request to NFVO 432. NFVO 432 approves the termination request and notifies VNFM 431. NFVO 432 drives VIM 433 to terminate UPF 424. In response, VIM 433 drives the MANO agent over the MANO link to terminate UPF 424. VNFM 431 notifies NRF 425 of the termination. NRF 425 removes UPF 424 and RAN 410 from the media conferencing PDU session service area.

The wireless data network circuitry described above comprises computer hardware and software that form special-purpose network circuitry to serve a Protocol Data Unit (PDU) session type over a Radio Access Network (RAN). The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve the PDU session type over the RAN.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a Protocol Data Unit (PDU) session type over a Radio Access Network (RAN), the method comprising:
   a Network Repository Function (NRF) receiving UPF requests for User Plane Functions (UPFs) that can adequately serve the PDU session type over the RAN and responsively transferring UPF responses indicating other UPFs that cannot adequately serve the PDU session type over the RAN;
   the NRF determining when the transfer of the UPF responses is excessive for the PDU session type and the RAN, and in response, transferring an instantiation request to a Management and Orchestration (MANO) system to instantiate a new UPF that can adequately serve the PDU session type over the RAN;
   the MANO system receiving the instantiation request from the NRF and responsively instantiating the new UPF; and
   the new UPF serving the PDU session type to User Equipment (UEs) over the RAN.

2. The method of claim 1 further comprising the NRF receiving a registration from the new UPF and correlating the new UPF with the RAN and the PDU session type.

3. The method of claim 1 wherein NRF transferring the UPF responses indicating other UPFs that cannot adequately serve the PDU session type over the RAN comprises determining that the RAN is not in a UPF service area for the PDU session type.

4. The method of claim 1 wherein NRF transferring the UPF responses indicating other UPFs that cannot adequately serve the PDU session type over the RAN comprises determining that the other UPFs are not in a UPF service area for the PDU session type.

5. The method of claim 1 wherein transferring the NRF transferring the instantiation request to the MANO system comprises transferring the instantiation request to a Virtual Network Function Manager (VNFM) that manages the NRF in the MANO system.

6. The method of claim 1 wherein the NRF determining when the transfer of the UPF responses is excessive for the PDU session type and the RAN comprises determining when the transfer of the UPF responses exceeds a threshold for a time period.

7. The method of claim 1 wherein the MANO system instantiating the new UPF comprises adding the RAN to a UPF service area for the PDU session type.

8. The method of claim 1 wherein the RAN comprises a tracking area.

9. The method of claim 1 further comprising:
   the NRF determining when the reception of the UPF requests for UPFs that can adequately serve the PDU session type over the RAN is minimal, and in response, transferring a termination request to the MANO system to terminate the new UPF; and
   the MANO system receiving the termination request from the NRF and responsively terminating the new UPF.

10. The method of claim 1 wherein the PDU session type comprises one of Ultra Reliable Low Latency Communications (URLLC), media conferencing, or media streaming.

11. A wireless communication network to serve a Protocol Data Unit (PDU) session type over a Radio Access Network (RAN), the wireless communication network comprising:
   a Network Repository Function (NRF) configured to receive UPF requests for User Plane Functions (UPFs) that can adequately serve the PDU session type over the RAN and responsively transfer UPF responses indicating other UPFs that cannot adequately serve the PDU session type over the RAN;

the NRF configured to determine when the transfer of the UPF responses is excessive for the PDU session type and the RAN, and in response, transfer an instantiation request to a Management and Orchestration (MANO) system to instantiate a new UPF that can adequately serve the PDU session type over the RAN;

the MANO system configured to receive the instantiation request from the NRF and responsively instantiate the new UPF; and the new UPF configured to serve the PDU session type to User Equipment (UEs) over the RAN.

12. The wireless communication network of claim 11 further comprising the NRF configured to receive a registration from the new UPF and correlate the new UPF with the RAN and the PDU session type.

13. The wireless communication network of claim 11 wherein the NRF is configured to transfer the UPF responses indicating other UPFs that cannot adequately serve the PDU session type over the RAN comprises the NRF configured to determine that the RAN is not in a UPF service area for the PDU session type.

14. The wireless communication network of claim 11 wherein the NRF is configured to transfer the UPF responses indicating other UPFs that cannot adequately serve the PDU session type over the RAN comprises the NRF configured to determine that the other UPFs are not in a UPF service area for the PDU session type.

15. The wireless communication network of claim 11 wherein the NRF is configured to transfer the instantiation request to the MANO system comprises the NRF configured to transfer the instantiation request to a Virtual Network Function Manager (VNFM) that manages the NRF in the MANO system.

16. The wireless communication network of claim 11 wherein the NRF is configured to determine when the transfer of the UPF responses is excessive for the PDU session type and the RAN comprises the NRF configured to determine when the transfer of the UPF responses exceeds a threshold for a time period.

17. The wireless communication network of claim 11 wherein the MANO system is configured to instantiate the new UPF comprises the MANO system configured to add the RAN to a UPF service area for the PDU session type.

18. The wireless communication network of claim 11 wherein the RAN comprises a tracking area.

19. The wireless communication network of claim 11 further comprising:

the NRF configured to determine when the reception of UPF requests for UPFs that can adequately serve the PDU session type over the RAN is minimal, and in response, transfer a termination request to the MANO system to terminate the new UPF; and the MANO system configured to receive the termination request from the NRF and responsively terminate the new UPF.

20. The wireless communication network of claim 11 wherein the PDU session type comprises one of Ultra Reliable Low Latency Communications (URLLC), media conferencing, or media streaming.

* * * * *